April 30, 1940. M. R. PRICE 2,198,885
COMPOSITE THERMAL INSULATING UNIT
Original Filed April 21, 1932

INVENTOR
BY MANLEY R. PRICE
Soule & Leonard
ATTORNEYS

Patented Apr. 30, 1940

2,198,885

UNITED STATES PATENT OFFICE 2,198,885

COMPOSITE THERMAL INSULATING UNIT

Manley R. Price, Cleveland, Ohio, assignor to The Celotex Corporation, Chicago, Ill., a corporation of Delaware Application April 21, 1932, Serial No. 606,637
Renewed August 23, 1939

5 Claims. (Cl. 154—45.9)

This invention relates to improvements in wallboard of the class including insulation-board, plaster-board, etc.

The general object is to provide a hard form wall-board or other unit of any desired shape which will have exceptional thermal insulation value, which will be of comparatively light weight, and have adequate strength to enable it to be effectively used as a building or insulation material.

Another object is to provide a light weight, fire-proof and thermal-insulative composition for wall-boards and the like.

The objects also include the provision of a new method of making hard form wall-boards.

Another object is to provide a building board which will answer all of the practical requirements of gypsum-board and yet which will be very much lighter in weight per cubic inch and just as strong.

Still another object is to provide a building board material which will be less susceptible to movement, due to changes in temperature, than ordinary hard form board materials and insulation-board materials.

A further specific object is to provide a building-board, the elements of which are so arranged as to greatly impede the transmission of sound waves therethrough and which will nevertheless have adequate stiffness and strength to serve in other respects in place of ordinary plaster-board and be economically applicable to building walls and ceilings in the same manner as plaster-board.

A further specific object is to provide a building board having the necessary strength and rigidity to enable it to be effectively used in place of lath or plaster and which will be both heat insulative and sound insulative to a high degree.

Other objects and features of the invention will become apparent from the following description relating to the accompanying drawing, wherein I have shown my preferred forms. The essential characteristics are summarized in the claims.

Figure 1:
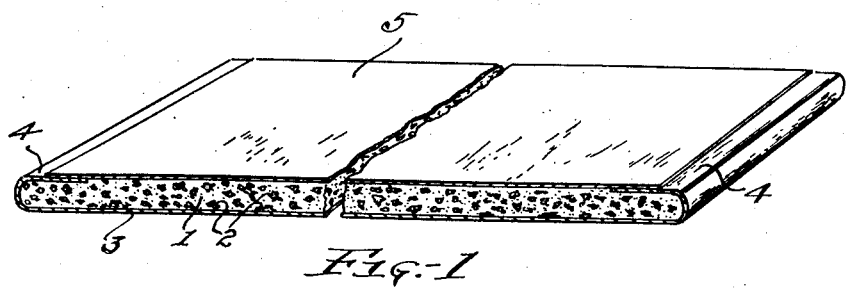
Figure 2:
Figure 3:
Figure 4:
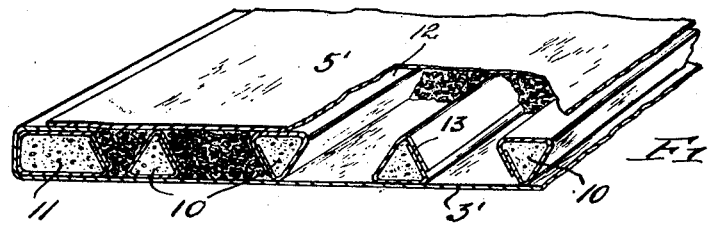
Figure 5:
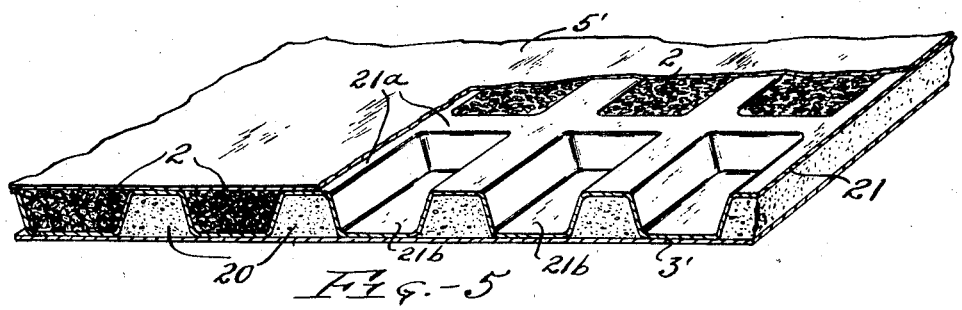
Figure 6:
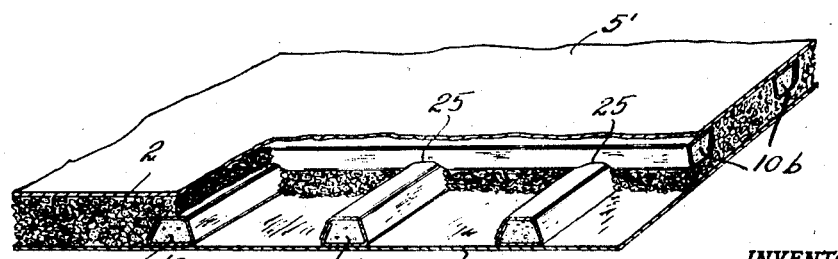

In the drawing, Fig. 1 is a fragmentary sectional perspective of the preferred arrangement of board; Fig. 2 is an enlarged view of a single granule of expanded stone used in carrying out my invention; Fig. 3 is a fragmentary perspective view showing a portion of a different form of board, and Figs. 4, 5 and 6 are sectional perspective views showing still further modifications including internal bracing and stiffening elements, particularly for use where sound insulation as well as thermal insulation is desired.

Heretofore hard form boards of the class of so-called "plaster-board" or "gypsum-board" have not been particularly thermal insulative. Commercial plaster-board, for example, has thermal insulative value of approximately 1.42 per degree F. per hour per inch thickness. I am enabled by the use of the present invention to about double this value in actual commercial practice, without detracting from other necessary or desired properties. The board herein shown and described below as Fig. 1 has a thermal insulative value of .75 per degree F. per hour per inch thickness.

Moreover, practically all hard form plaster-board if made in the desired sizes and of sufficient thicknesses to effectively withstand handling in placement on the job is very unwieldy because of its weight. For illustration, boards of 3/8" thickness weigh at least 1750# per 1,000 sq. ft. By the use of the present invention, I am enabled in actual commercial practice to reduce this weight to lower than 1350# per 1,000 sq. ft. —without sacrifice of strength or other desired qualities and without incurring any additional breakage problems. A great saving in shipping cost is thereby effected and the board is, of course, much easier to handle on the job and to ship and store.

Heretofore, principally in order to decrease the weight of plaster-board, several different kinds of lightening materials have been used; for example, sawdust, cork, tan-bark, diatomaceous earth, tufa, various forms of volcanic ash, mica flakes, expanded phlogopite; in fact many other materials have been used with greater or less success, usually embedded in some form of plaster or cement. I have found, however, that such materials heretofore used lack one or more of several highly desirable characteristics.

For example, the sawdust (and other forms of vegetable fiber) will readily burn and the use thereof even as a component of plaster-board detracts from the fire-proofing values of such board. The diatomaceous earths, highly inert substances, principally lime, have little internal strength and the thermal insulative value is low. Tufa and volcanic ash have no marked thermal insulative value and are, moreover, not especially light in weight—or not uniformly so— as a practical matter. Expanded flakes of mica, say Zonolite, while comparatively light in weight and fire-proof, do not possess the desired internal strength characteristics and do not bond well with gypsum or any other practically available cementaceous material for plaster-board use. Practically all of the materials above mentioned expand and contract considerably under normal weather temperature and humidity changes and this results in warpage and fracture. The present invention greatly reduces this.

The material which I use as a core for building board and in various ways, as will be described below, is highly artificially expanded stone with a silicate of lime base. The material is already known, prior to my invention, and has been called "expanded stone," " 'pop-corn' slag," "rock sponge" and "Calicel." There are several raw materials from which this expanded stone may be obtained, but the treatment to produce it is essentially the same in each case. Ordinary limestone, preferably with a small percentage of alumina and silica, may be subjected to fusing temperature and, when suddenly cooled, breaks up into highly porous granules, with greatly increased bulk, resembling a petrified sponge. Since the effectiveness of limestone for my purpose is increased by the addition of alumina and silica, blast furnace slag, which is calcium aluminum silicate in a complex formula, is economically suited to the present purpose, being a mere by-product of the steel industry with immense sources available. Blast furnace slag may require the addition of alumina. This material, however made, does not expand or contract responsive to extremes in weather temperature, hence reduces warpage and fracture of the board containing it.

The expanding treatment is, in general, to suddenly cool the mass of molten rock material when at a temperature in excess of 2000° F., resulting in intumescing and expanding the rock material 20 to 40 times its original volume. Incidentally, this cooling treatment results in granulating the expanded material to the desired dimensions for use in building board, such as any of the forms illustrated herewith, thereby saving the expense of crushing. It may of course be further crushed and screened if desired. Tests on blocks of this granulated material show a density of form 4.2 to 12 pounds per cubic foot, and a thermal insulation value or thermal coefficient in the neighborhood of .24. This will vary from .30 to .18 depending on the size of granules, nature and quantity of binder, etc.

The present invention makes it possible to provide hard form boards comparable in thermal insulation value to wall-boards sold specifically as heat insulation boards, the better of which contain organic fibrous materials, most of which—unless the thermal insulative value thereof is greatly reduced by chemical etc. treatment—will burn.

Referring to the drawing, and first to Fig. 1, this shows a composite sheet of cementitious material 1 in which are embedded a large number of integral granules 2 of the highly expanded lithic material, such as above described, the granules preferably constituting in excess of 20% but less than 35% by weight of the entire core composition of the sheet. The body 1 may be ordinary gypsum or any other material which will set suitably hard, because any cementitious material will bond with the expanded stone, as will be readily appreciated from a showing of a granule thereof in Fig. 2. The weight of this material varies considerably in accordance with the size of the granules but even though the material is reduced to a minimum sized particle or aggregate to function efficiently in relation to heat insulation and also lighten the composition, it would not weigh over twenty pounds per cubic foot. Calcined gypsum (plaster of Paris) is preferred. The calcined gypsum expands upon hardening due to intumescence, as is well known, with the result that the partial cells forming the exterior surfaces of the granules become completely filled with the binder material which latter firmly and mechanically interlocks the individual granules together while completely enveloping the individual granules maintaining the same for the most part out of actual contact with each other to better resist transmission of heat into and through the board. The intumescence also further lightens the board. The composite sheet has a liner or cover sheet of say chip-board 3, folded in over the edge of the inner body sheet while plastic, as at 4, and overlapped by the marginal edges of another liner or cover sheet 5 of similar material, say chip-board.

In formation, the dry expanded stone and dry gypsum are intimately mixed and the mixture properly wetted, after which the wet mixture is poured onto the sheet 3 fed from a suitable roll onto a channel surface adapted to hold the side margins of the sheet bent upwardly to receive and contain the material. Afterward, the edge margins are folded over the plastic mass as at 4, and, substantially at the same time, the layer of chip-board 5 is applied as from another roll, and the assemblage passed between suitable heavy calender rolls to size the composite sheet and eliminate surface inequalities. I have found in practice that where the expanded stone granules are of such size as to require crushing between the upper and lower layers of chip-board during the calendering process, this does no harm whatsoever to the chip-board or to the final product. The expanded stone crushes very easily and sufficiently mixes with the wet plaster to afford the necessary local strength. The crushing is only sufficient to reduce the board to the desired thickness.

Referring to Fig. 2, this illustrates that each of the granules 2 of artificially expanded stone contains a multiplicity of air cells irregularly variegated in size as illustrated by small circles and dots, the fractured larger cells on the outer surfaces of the granules forming pockets 2a, the external surface effects of the granules thus providing cavities with sharply defined edges into which cavities the binder material, such as calcined gypsum, or any other cementitious material, will flow and when set cling tenaciously, firmly interlocking the granules through the medium of the binder.

The internal structure of the granules is much more dense and hence stronger than the surface effects would indicate, the internal cells being for the most part smaller than the more easily fractured larger cells which form the relatively large cave-like pockets on the outside. A further important characteristic of the granules from the standpoint of thermal insulation is that all the cell wall surfaces appear highly polished which is a recognized important factor in preventing heat loss through the board or composition by radiation.

Referring to Fig. 3, this shows a board very much on the order of that of Fig. 1, except that a considerably less proportion of cementitious body 1 is used, that is, a less proportion of the plastic filler, such as gypsum, to a given quantity of expanded stone 2. This is somewhat at the sacrifice of strength, but obviously decreases the weight per cubic inch and increases the thermal insulation value; likewise fire-proofing qualities.

Fig. 4 shows a method of increasing the strength and adaptability of a board containing a high percentage of the highly expanded stone, namely, by providing within the same a series of reinforcing ribs, there being spaced parallel ribs 10 internally of the board and suitable side edge reinforcing ribs 11, somewhat wider in the plane of the board. In the case of the triangular ribs, these are disposed with flat sides and corners engaging opposite cover members 3', 5' in alternating arrangement, i. e. turned first one way and then the other, whereby the combined reinforcing beam effects of the several ribs will be the same with the board positioned or suspended either side up. Any suitable adhesive may be used to hold the ribs in place, particularly against the cover sheets, and the ribs are preferably wrapped in suitable covering, such as paper, cloth or other woven fabric, the wrapping 12, illustrated, being overlapped as at 13. The triangular form of ribbing moreover reduces sound transmission by the relatively denser ribs, and the ribs provide a relatively more stable body through which to nail the board onto supports, such as studding or rafters.

In the showing of Fig. 4, it may be assumed that the granules 2 are mixed with an adequate quantity of cementitious material, such as gypsum, Portland cement, silicate of soda, etc. to fully embed and enclose the individual granules, but the granules may instead be merely stuck together lightly with a considerably less quantity of binding or adhesive which either hardens or stays more or less plastic. In some instances, the spaces between the ribbing may be merely filled with the expanded stone granules. The above suggested variations are determined by the sound insulating value desired for the board, for this value is greatly increased if the binder material is omitted entirely, allowing for greater freedom of movement of the granules to better dissipate sound waves and reduce transmission thereof through or by the board or parts thereof acting as a diaphragm or diaphragm elements.

Fig. 5 shows a different arrangement of ribbing for a board, in which a very light binder is intended to be used between the granules of expanded stone, and in some instances, no binder at all. The ribbing is formed by material, such as gypsum, Portland cement, etc. at 20 at one side only of suitable partition forming sheet material 21, such as chip-board, this having alternately disposed ridges 21a and depressions 21b, the ridges containing the bracing body of gypsum, etc. and being interconnected and extending both longitudinally and transversely of the board. The depressions are filled with the expanded stone granules 2, with or without binder. The liner and cover layers of say chip-board 3' and 5' are secured to the upper and lower faces of the paper, etc. body 21 by any suitable adhesive.

Fig. 6 shows a further development of the arrangement of Fig. 5, permitting extruded and, if desired, suitably wrapped strands or bars of material, such as gypsum or Portland cement, to be used in obtaining equal reinforcement longitudinally and transversely of a board if desired. The ribs of one series extend longitudinally of the sheet, as at 10a, being secured to the cover material 3', in which case the transverse ribs, indicated at 10b are secured to the cover material 5'. Where the ribs cross each other, as at 25, they may of course be suitably cemented together.

The core material 2 may be either loose filled —dry— or assuming binder, then poured in and around the ribbing after the ribbing has been attached to one cover layer, but before the other cover layer has been attached.

In loose filling any form of board internally braced by ribbing as illustrated in excess of granules may be used which, upon application of the second cover sheet—as by a suitable roll and considerable pressure—will completely fill the spaces between the ribs without leaving any bulges or depressions in the cover layers.

It has been mentioned that in providing especially for high thermal insulation value in the practice of my invention sufficient binder material is used to isolate the granules of expanded stone from each other. This reduces transmission of heat by convection because no air can circulate between the different granules of the mass as it could if only a superficial body of binder material is used or if no binder is used (as in loose-fill). Transmission of heat by conduction is greatly reduced in any manner of practicing my invention although it must be admitted that in fully embedding the granules of expanded stone in gypsum e. g., say according to Fig. 1, the quality of the board or composition to resist the transmission of heat by conduction is somewhat sacrificed for the sake of providing adequate or desired strength. Nevertheless the thermal-conductivity of the board according to Fig. 1, using even less than 20% by weight of the highly expanded lithic granules compares very favorably with wall boards built and sold specifically as heat insulation boards but which do not have other important desirable characteristics of the Fig. 1 arrangement, fire resisting qualities and stability particularly. Transmission of heat by radiation is also opposed by the reflective quality of the myriads of highly polished wall surfaces of the cells of the granules, and this of course applies to all forms of the invention shown or described.

For a better understanding of the appended claims, the following should be noted:

I. The present invention as a practical matter and for the purpose of classification relates exclusively to improvements in (a) —Plaster board—, (b) —Plaster wall board— and (c) —Wall plaster composition—, as these terms are employed in the trade.

II. The invention is not to be considered an improvement in or over the following, as known to the trade: (a) —Insulation board—, examples being: "Celotex" (sugar cane fiber), "Masonite" (exploded wood fibers), (b) —Wall board—, examples being: "Beaver board" "Upson board" and "Prest wood" (composed of various vegetable fibers but having no marked thermal insulation value and used principally for decorative effect, (c) —Accoustical wall covering—, an example being: "Calicel accoustical tile." See U. S. Patent 1,869,367 ("rock sponge" granules secured by very light binder, purposely allowing the granules to touch each other as much as possible for absorption and diffusion of sound waves).

Incidentally, it is to be understood that I do not claim to be the first to recognize the thermal insulation value of highly expanded stone ("rock sponge", "popcorn slag", etc.). The thermal-insulative value of this as a granular fill is given for example under "Calicel" on page 34 of the American Society of Heating and Ventilating Engineers Guide (1932) and in other publications prior to the above. The weight of this material is also given as 4.2 per cubic foot (referring to dry weight).

I believe, however, that I am the first to use this material (a) in a wall board including an outer protective envelope and an internal strengthening medium—either (a-1) hard and relatively stiff ribbing segregating portions of the granule aggregate from other portions, or (a-2) a proportion of relatively strong binder material—such that the granules are individually enveloped and isolated from each other and firmly interlocked through the medium of the binder; and (b) to use granules of this material in a plaster composition for use as a wall covering wherein the granules are enveloped in a proportion of binder material such that the granules are for the most part isolated from each other by and interlocked through the medium of the binder material.

Summary

Having in mind particularly the arrangements of Figs. 1 and 3, it will be seen from the above description that I have provided a composite unit in the class of plaster board and plaster wall board having as the more important advantages over boards in these classes, the following: The unit may be made following the usual practice in making plaster board without adding to the cost and without even having to screen or size the granular filler material. Moreover, the actual cost is decreased due to the cheapness of the granular material and reduction of the gypsum e. g. content. Moreover, thermal insulation value is about doubled, unit weight is greatly decreased, and fire resistance is materially increased. Nevertheless stability is maintained, i. e. the board is not susceptible to movement due to changes in temperature and weather conditions because the added material (the expanded stone) is highly inert and is not hygroscopic.

When the proportion of the highly expanded stone granules is no more than 20% by weight of the entire composition of the board (exclusive of the chipboard or other envelope material), the improved board herein described is just as strong as any plaster board or plaster wall board now on the market.

When internal reinforcement is used as in Figs. 4 to 6 e. g., I may increase the proportion of expanded stone and still obtain strength qualities comparable favorably with the strongest plaster board and plaster wall board now on the market but with the unique advantages over such boards of high sound insulation value as well as higher thermal insulation value, less unit weight and increased fire resistance. (No claim for sound insulation value is made for the forms of the invention shown in Figs. 1 and 3 hereof or for that matter, the other figures, unless the binder is practically omitted from between the individual granules of expanded stone.)

It will be seen further that I have effected an improvement in wall e. g. plaster composition resulting in greatly increased thermal insulation value, and greatly decreased unit weight, together with the retention of adequate strength and stability for material of this class.

Having thus described my invention, I claim:

1. A wall-board, comprising a substantially rigid skeleton having interstices therein, sheet material enveloping the skeleton, and granular highly porous calcium silicate material in and retained in the interstices of the skeleton by said sheet material.

2. A wall-board, comprising means forming a substantially rigid skeleton having interstices therein, sheet material enveloping the skeleton and granular highly porous and cellular lithic material in and retained in loose fill formation in the interstices of the skeleton whereby relative movement of the granules will tend to dissipate sound vibration imparted to the board and thus reduce transmission of sound waves therethrough.

3. A wall-board, comprising longitudinally extending and cross connected intersticed inner ribbing, cover sheet material enveloping the ribbing, and highly porous lithic material occupying the interstices of said ribbing and retained therein by said cover sheet material.

4. A wallboard comprising cover sheets separated by partitions adapted to form a plurality of interstices between the cover sheets and the partitions, and granules of heat insulating material comprising highly expanded stone occupying the interstices formed by the partitions and the cover sheets, whereby an insulating wallboard is formed.

5. A wallboard comprising a substantially rigid prefabricated skeleton having interstices, sheet material enveloping the prefabricated skeleton, and granular intumesced and highly expanded lithic insulating material retained in the interstices of the prefabricated skeleton by said sheet material.

MANLEY R. PRICE.